(12) United States Patent
Tsunoya (10) Patent No.: US 11,465,211 B2
(45) Date of Patent: Oct. 11, 2022

(54) METHOD FOR MANUFACTURING THREE-DIMENSIONAL SHAPED OBJECT

(71) Applicant: Seiko Epson Corporation, Tokyo (JP)

(72) Inventor: Akihiko Tsunoya, Okaya (JP)

(73) Assignee: SEIKO EPSON CORPORATION

( * ) Notice: Subject to any disclaimer, the term of this patent is extended or adjusted under 35 U.S.C. 154(b) by 97 days.

(21) Appl. No.: 16/891,286

(22) Filed: Jun. 3, 2020

(65) Prior Publication Data
US 2020/0384534 A1 Dec. 10, 2020

(30) Foreign Application Priority Data

Jun. 4, 2019 (JP) .............................. JP2019-104632

(51) Int. Cl.
| | |
|---|---|
| B22F 10/20 | (2021.01) |
| B28B 1/00 | (2006.01) |
| B22F 3/10 | (2006.01) |
| B22F 1/10 | (2022.01) |
| B33Y 10/00 | (2015.01) |

(52) U.S. Cl.
CPC ............... B22F 10/20 (2021.01); B22F 1/10 (2022.01); B22F 3/1021 (2013.01); B28B 1/001 (2013.01); B22F 2003/1042 (2013.01); B22F 2202/11 (2013.01); B33Y 10/00 (2014.12)

(58) Field of Classification Search
CPC .................. B22F 1/0059; B22F 3/1021; B22F 2003/1042; B28B 1/001; B33Y 10/00
See application file for complete search history.

(56) References Cited

U.S. PATENT DOCUMENTS

| | | | |
|---|---|---|---|
| 2015/0258705 A1* | 9/2015 | Hirata | B29C 64/165 |
| | | | 428/210 |
| 2017/0014950 A1 | 1/2017 | Okada | |
| 2018/0093326 A1* | 4/2018 | Ishida | B29C 64/40 |
| 2019/0077075 A1 | 3/2019 | Tsunoya et al. | |

FOREIGN PATENT DOCUMENTS

| | | |
|---|---|---|
| CN | 104908318 A | 9/2015 |
| CN | 109483879 A | 3/2019 |
| WO | 2015/141032 A1 | 9/2015 |

* cited by examiner

Primary Examiner — Anthony J Zimmer
Assistant Examiner — Ricardo D Morales
(74) Attorney, Agent, or Firm — Harness, Dickey & Pierce, P.L.C.

(57) ABSTRACT

A method for manufacturing a three-dimensional shaped object includes a structure shaping step of supplying a shaping material including metal powder or ceramic powder, and supplying a binder to a region corresponding to a structure S of the three-dimensional shaped object to be shaped in the shaping material (step S140), a support shaping step of shaping, with a support material including a resin, a support T supporting the structure S (step S130), and a degreasing step of degreasing the support T and the binder, the support T being in a state of supporting the structure S (step S200).

6 Claims, 11 Drawing Sheets

METHOD FOR MANUFACTURING THREE-DIMENSIONAL SHAPED OBJECT

The present application is based on, and claims priority from JP Application Serial Number 2019-104632, filed Jun. 4, 2019, the disclosure of which is hereby incorporated by reference herein in its entirety.

BACKGROUND

1. Technical Field

The present disclosure relates to a method for manufacturing a three-dimensional shaped object.

2. Related Art

In a related art, there are various types of methods for manufacturing a three-dimensional shaped object. Among these manufacturing methods, there is a method for manufacturing a three-dimensional shaped object in which a structure is shaped in a state in which the structure is supported by a support. For example, WO 2015/141032 discloses a method for manufacturing a three-dimensional shaped object in which a layer of a shaping material, which is a powdery metal material, is supported by a support layer, in which a powdery metal material is used as a support material, to shape a laminate shaped object.

However, in the method for manufacturing a three-dimensional shaped object in which the structure is shaped in the state where the structure is supported by the support in the related art as described in WO 2015/141032, when a shape of the structure is complicated, the support cannot be removed in some cases.

SUMMARY

A method for manufacturing a three-dimensional shaped object according to the present disclosure includes a structure shaping step of supplying a shaping material including metal powder or ceramic powder, and supplying a binder to a region corresponding to a structure of the three-dimensional shaped object to be shaped in the shaping material; a support shaping step of shaping, with a support material including a resin, a support supporting the structure; and a degreasing step of degreasing the support and the binder, the support being in a state of supporting the structure.

DESCRIPTION OF EXEMPLARY EMBODIMENTS

First, the present disclosure will be schematically described.

A method for manufacturing a three-dimensional shaped object according to a first aspect of the present disclosure for solving the above problems includes a structure shaping step of supplying a shaping material including metal powder or ceramic powder, and supplying a binder to a region corresponding to a structure of the three-dimensional shaped object to be shaped in the shaping material; a support shaping step of shaping, with a support material including a resin, a support supporting the structure; and a degreasing step of degreasing the support and the binder, the support being in a state of supporting the structure.

According to the aspect, the structure is shaped by the binder and the shaping material including the metal powder or the ceramic powder, the support is shaped with the support material including the resin, and not only the binder but also the support in the state of supporting the structure are degreased. Therefore, by degreasing the support, a possibility that the support cannot be removed can be reduced even when a shape of the structure is complicated.

In a method for manufacturing a three-dimensional shaped object according to a second aspect of the present disclosure, according to the first aspect, when the structure shaping step and the support shaping step are performed to form one or more layers, the structure shaping step is performed after the support shaping step is performed for every layer, and the shaping material is supplied to a position other than a shaping position of the support in the structure shaping step.

According to the aspect, the structure is shaped after the support is shaped in each layer. Therefore, in each layer, the structure can be easily formed at a desired forming position of the structure, and the support can be formed at a desired forming position of the support.

In a method for manufacturing a three-dimensional shaped object according to a third aspect of the present disclosure, according to the first aspect, when the structure shaping step and the support shaping step are performed to form one or more layers, the support shaping step is performed after the structure shaping step is performed for every layer, a removing step of removing, from a shaping position of the support, the shaping material supplied along with performing of the structure shaping step is performed, and in the support shaping step, the support material is supplied to the shaping position of the support, from which the shaping material is removed in the removing step, to shape the support.

According to the aspect, in each layer, the structure is shaped prior to the shaping of the support, and the support is shaped after the shaping material at the shaping position of the support is removed. By shaping the structure first, the shaping material can be evenly supplied to each layer, and a high-rigidity structure can be shaped.

In a method for manufacturing a three-dimensional shaped object according to a fourth aspect of the present disclosure, according to any one of the first to third aspects, the resin is an ultraviolet curable resin, and the support shaping step includes an irradiation step of irradiating the support material with ultraviolet rays.

According to the aspect, since the support can be shaped with high precision using the support material including the ultraviolet curable resin, a high-precision structure can be shaped.

In a method for manufacturing a three-dimensional shaped object according to a fifth aspect of the present disclosure, according to any one of the first to third aspects, the resin is a thermoplastic resin, and in the support shaping step, the support is shaped by injecting the support material in a molten state.

According to the aspect, since the support can be easily shaped using the support material including the thermoplastic resin, the structure can be easily shaped.

A method for manufacturing a three-dimensional shaped object according to a sixth aspect of the present disclosure includes, according to any one of the first to fifth aspects, a sintering step of sintering the shaping material after the degreasing step.

According to the aspect, since the method includes the sintering step, a high-rigidity three-dimensional shaped object in which the metal powder or the ceramic powder is sintered can be shaped.

In a method for manufacturing a three-dimensional shaped object according to a seventh aspect of the present disclosure, according to any one of the first to sixth aspects, the degreasing step is a step of heating and vaporizing the support.

According to the aspect, degreasing can be easily performed by heating and vaporizing the support.

In a method for manufacturing a three-dimensional shaped object according to an eighth aspect of the present disclosure, according to any one of the first to sixth aspects, the degreasing step is a step of dissolving the support with a solvent.

According to the aspect, the degreasing can be performed with high precision by dissolving the support with the solvent.

Embodiments of the present disclosure will be described below with reference to accompanying drawings.

First Embodiment

Figure 1:
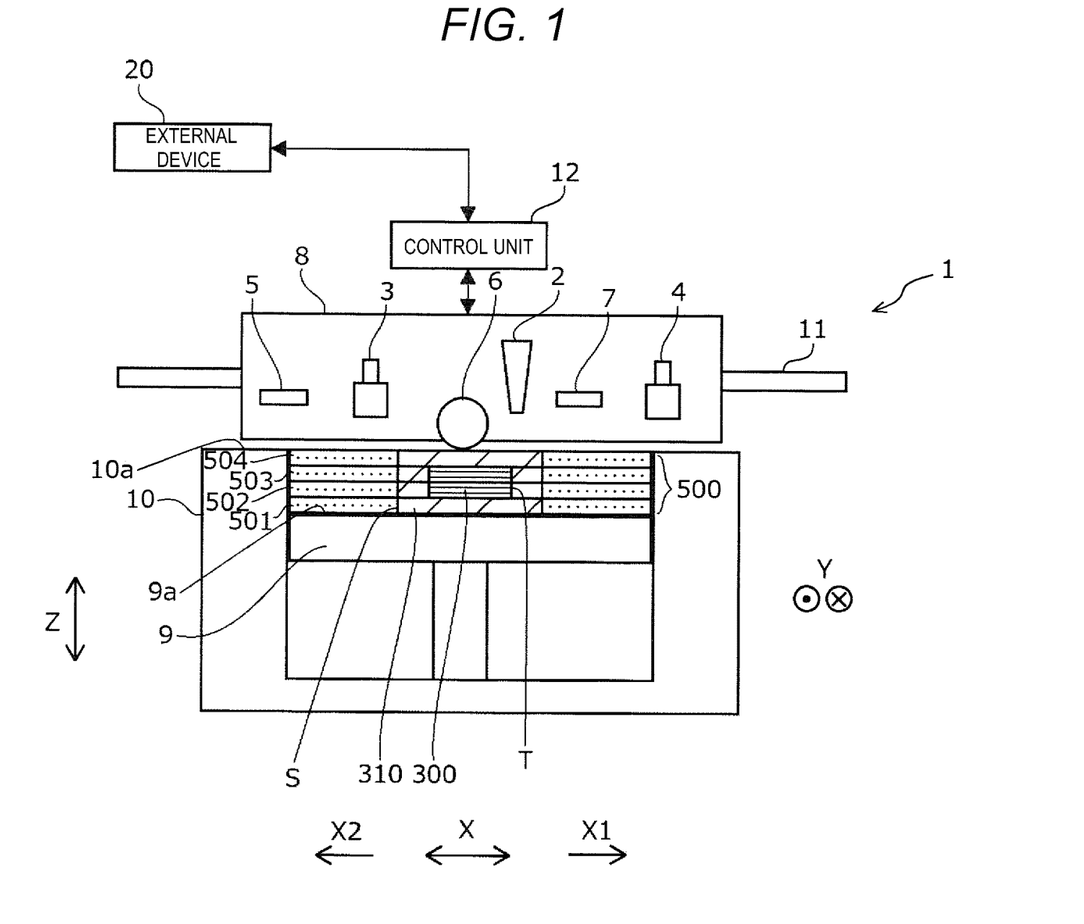
FIG. 1 is a schematic configuration diagram showing a device for manufacturing a three-dimensional shaped object according to a first embodiment, and the device is configured to perform a method for manufacturing a three-dimensional shaped object according to the present disclosure.

First, an example of a device 1 for manufacturing a three-dimensional shaped object will be described with reference to FIG. 1, and the device 1 is configured to perform a method for manufacturing a three-dimensional shaped object according to the present disclosure. Here, an X direction in FIG. 1 and each of drawings to be described below is a horizontal direction, and a Y direction is a horizontal direction and is a direction orthogonal to the X direction. Further, a Z direction is a vertical direction and corresponds to a lamination direction of a layer 500.

A term "three-dimensional shaping" in this specification indicates forming a so-called three-dimensional shaped object, for example, forming a shape having a thickness even in a shape of a flat plate, that is, a so-called two-dimensional shape is also included. Further, a term "support" means not only a case of supporting from a lower side, but also a case of supporting from a lateral side and, in some cases, a case of supporting from an upper side.

The device 1 for manufacturing a three-dimensional shaped object according to the embodiment is a device for manufacturing a three-dimensional shaped object in which the three-dimensional shaped object is manufactured by laminating the layer 500 including a layer 501, a layer 502, a layer 503, . . . , and a layer 50*n*. Then, as shown in FIG. 1, the device 1 for manufacturing a three-dimensional shaped object according to the embodiment includes a table unit 10 that includes a shaping table 9, a supply unit 8 that supplies a shaping material of the three-dimensional shaped object and a support material supporting the shaping material to the shaping table 9, and a control unit 12 that controls operations of the table unit 10 and the supply unit 8. The device 1 for manufacturing a three-dimensional shaped object is electrically coupled to an external device 20 such as a personal computer, and is configured to receive an instruction from a user via the external device 20.

The shaping table 9 is configured to be movable in the Z direction under a control of the control unit 12. A shaping surface 9*a* of the shaping table 9 is arranged at a position lower than an upper surface portion 10*a* of the table unit 10 by a predetermined distance in the Z direction, and the shaping material of the three-dimensional shaped object is supplied from the supply unit 8 to the shaping surface 9*a* to form the layer 500 for one layer. Then, laminating is performed by repeating a downward movement of the shaping table 9 by a predetermined distance and a supply of the shaping material of the three-dimensional shaped object from the supply unit 8. FIG. 1 shows a state in which a structure S of the three-dimensional shaped object is formed on the shaping surface 9*a* by repeating layer forming of four layers, the layer 501, the layer 502, the layer 503, and a layer 504.

The supply unit 8 is configured to be movable in the X direction along a guide bar 11. In addition, the supply unit 8 includes a shaping material supply unit 2 that supplies the shaping material including metal powder or ceramic powder to the shaping table 9. In addition, the supply unit 8 includes a compression roller 6 that can compress and level the shaping material supplied to the shaping table 9.

In addition, the supply unit 8 includes a support supply unit 4 that supplies a pasty support material including a resin to form a support T supporting the structure S. The support supply unit 4 of the embodiment is configured to be able to inject ultraviolet curable ink, containing an ultraviolet curable resin, as the support material. In addition, the supply unit 8 includes an ultraviolet irradiating unit 7 that irradiates ultraviolet rays for curing the ultraviolet curable ink. However, the present disclosure is not limited to the supply unit 8 having such a configuration. For example, the supply unit 8 may include the support supply unit 4 that can supply the support material including a thermosetting resin to the shaping table 9. When such a support supply unit 4 is provided, for example, the supply unit 8 can be configured to supply the heated support material to the shaping table 9 from the support supply unit 4 and to cure the support material supplied to the shaping table 9 by cooling.

In addition, the supply unit 8 includes a binder supply unit 3 that supplies a binder of the shaping material to a region corresponding to the structure S in the layer 500. The binder of the embodiment contains a resin and a solvent that dissolves the resin.

Although the details will be described later, during forming of the respective layers 500, when a support layer 300, which is a layer of the support T, is formed, the supply of the support T from the support supply unit 4 is performed prior to the supply of the shaping material from the supply unit 8. Then, the shaping material is supplied from the supply unit 8 to a position other than a forming position of the support layer 300, the binder is supplied from the binder supply unit 3 to a corresponding position of the structure S, and a structure layer 310 is formed.

In addition, the supply unit 8 includes a heater 5 that dries the solvent contained in the binder supplied from the binder supply unit 3. As the heater 5, for example, an infrared heater or the like can be used, but there is no particular limitation. By supplying the binder to the shaping material in the region corresponding to the structure S and drying the solvent contained in the binder, a shape of the region can be maintained even when the support T and the shaping material are removed from an adjacent position.

Figure 2:
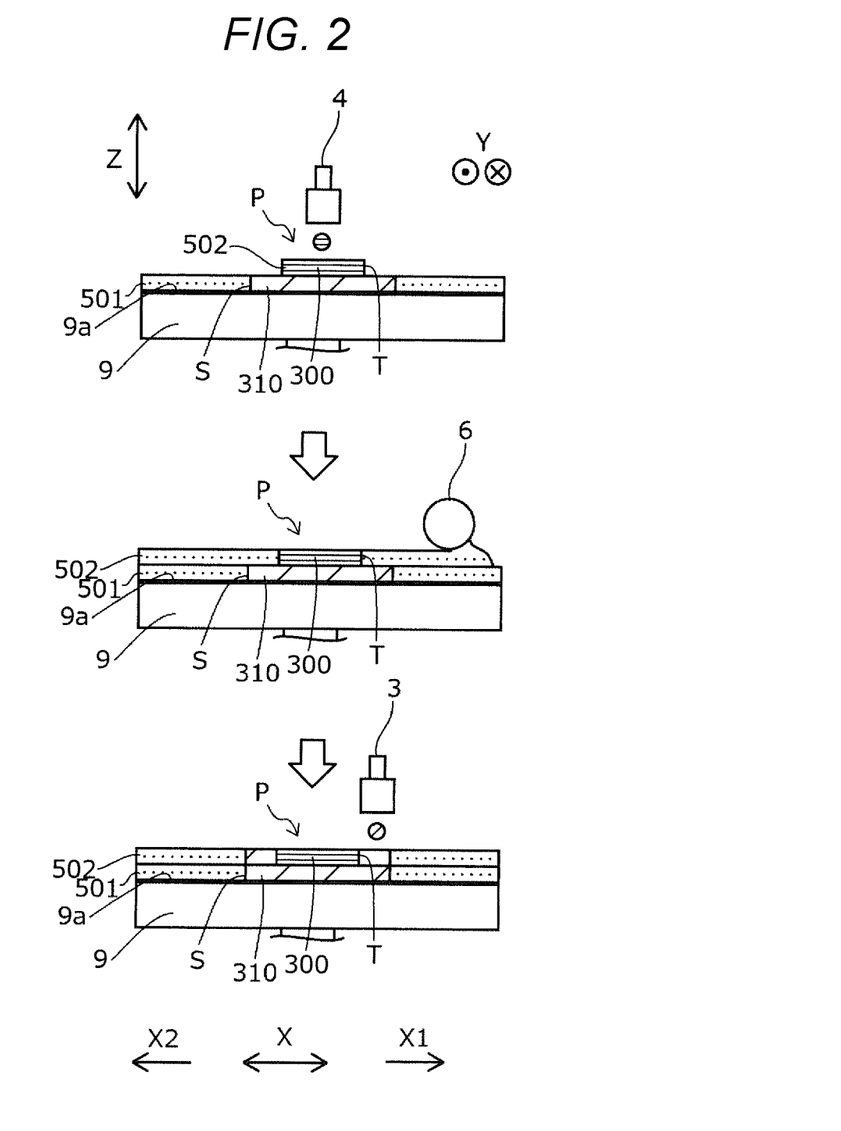
FIG. 2 is a schematic diagram illustrating a method for manufacturing a three-dimensional shaped object according to one embodiment of the present disclosure, and the method is performed using the device for manufacturing a three-dimensional shaped object according to the first embodiment.

Next, an example of the method for manufacturing a three-dimensional shaped object that can be performed using the device 1 for manufacturing a three-dimensional shaped object will be described with reference to FIG. 3 while referring to FIG. 2 and FIGS. 4 to 8. FIG. 2 illustrates an example when the layer 502 of the layers 500 is formed.

Figure 3:
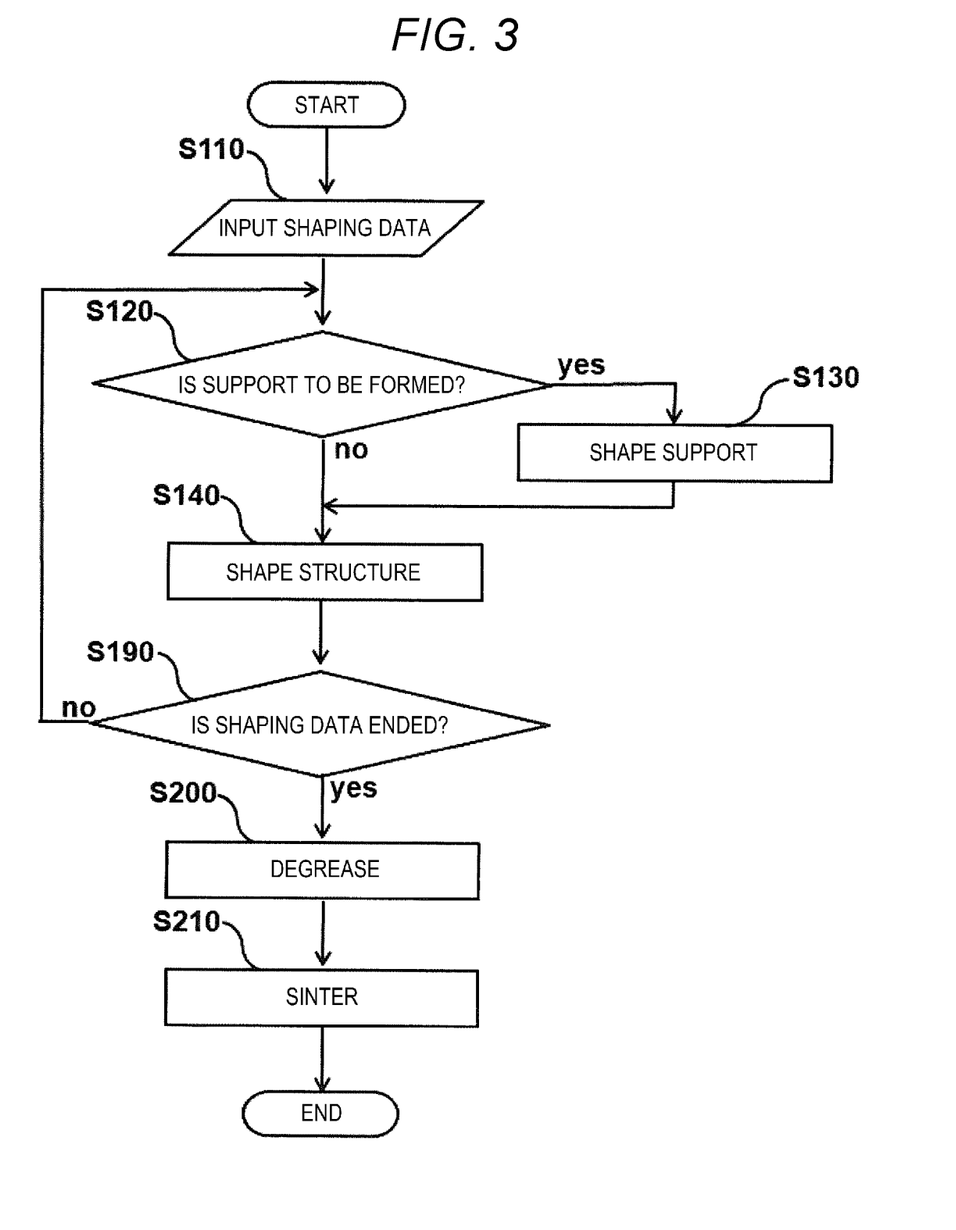
FIG. 3 is a flowchart of the method for manufacturing a three-dimensional shaped object according to one embodiment of the present disclosure, and the method is performed using the device for manufacturing a three-dimensional shaped object according to the first embodiment.

In the method for manufacturing a three-dimensional shaped object according to the embodiment, as shown in FIG. 3, first, in a shaping data input step of step S110, shaping data of a three-dimensional shaped object to be manufactured is input. An input source of the shaping data of the three-dimensional shaped object is not particularly limited, and the shaping data can be input, using the external device 20, to the device 1 for manufacturing a three-dimensional shaped object.

Next, in a support forming determining step of step S120, the control unit 12 of the device 1 for manufacturing a three-dimensional shaped object determines, based on the shaping data, whether or not to form the support layer 300 in the layer 500 during forming of the layer 500. Then, when it is determined that the support layer 300 is to be formed, the process proceeds to a support shaping step of step S130, and when it is determined that the support layer 300 is not to be formed, the process proceeds to a structure shaping step of step S140.

Figure 4:
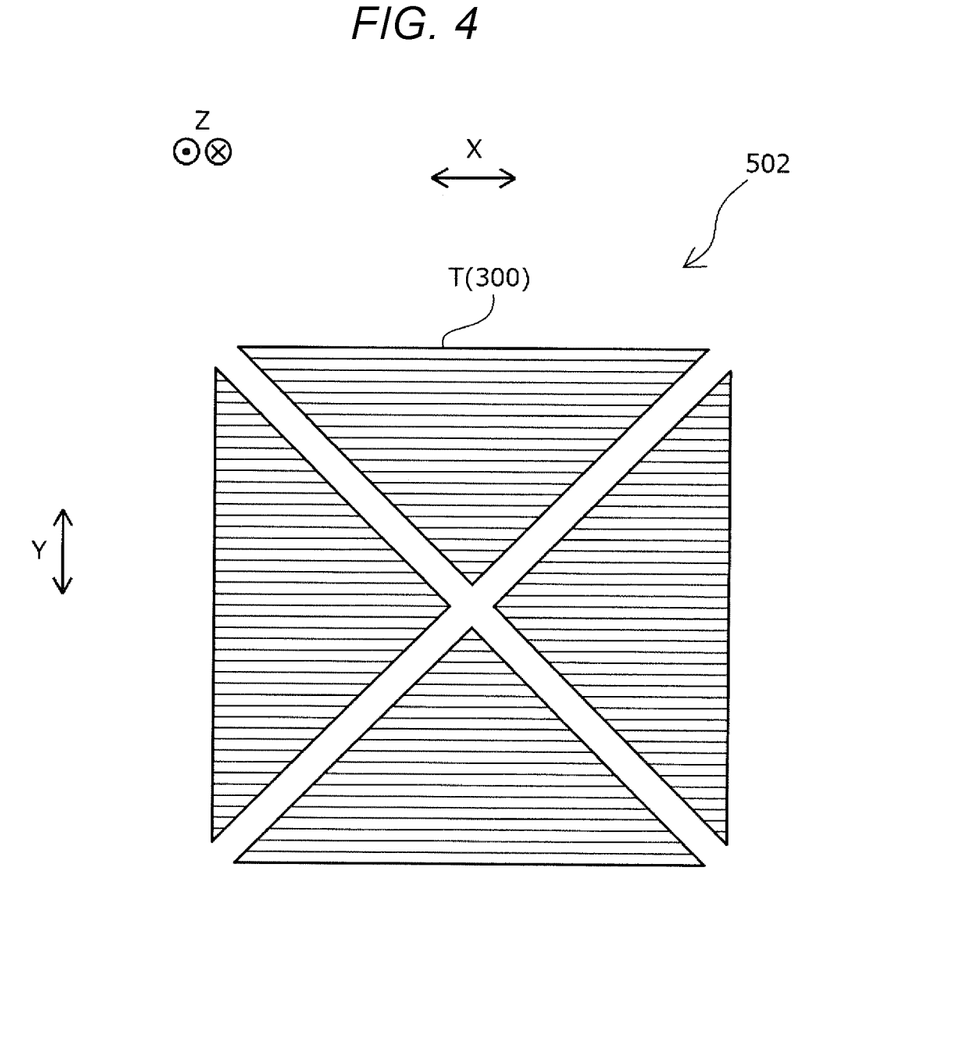
FIG. 4 is a schematic plan view showing an example of a single-layer support when a structure is shaped by the method for manufacturing a three-dimensional shaped object according to one embodiment of the present disclosure.

In the support shaping step of step S130, as described above, the support layer 300 is shaped, with the support material including the resin, as the support T supporting the structure S of the three-dimensional shaped object. In the embodiment, for example, as shown in atop state of FIG. 2, the support material, which is the ultraviolet curable ink, is supplied from the support supply unit 4, and then an irradiation step of irradiating the support material with ultraviolet rays from the ultraviolet irradiating unit 7 is performed to shape the support T. When one that can supply the support material including a thermosetting resin is used as the support supply unit 4, the irradiation with the ultraviolet rays from the ultraviolet irradiating unit 7 can be omitted. Here, FIG. 4 is a schematic plan view of an example of the support layer 300 formed as the support T by performing the support shaping step of step S130.

Figure 5:
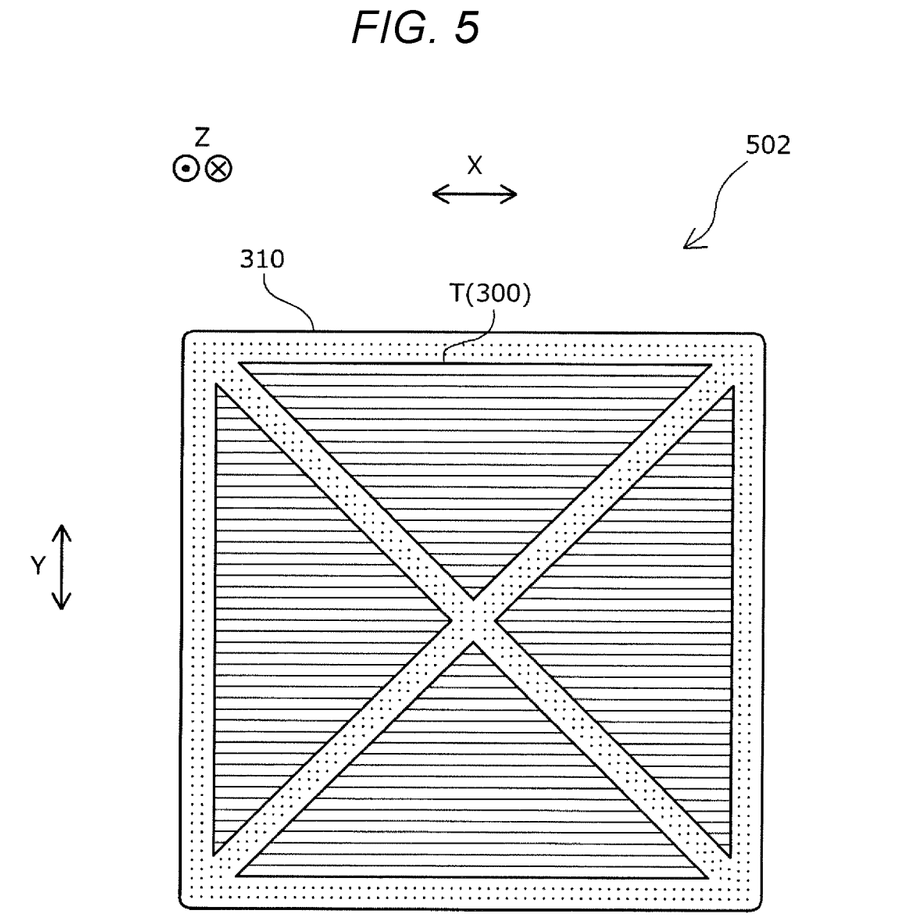
FIG. 5 is a schematic plan view showing an example of a single-layer structure and support when the structure is shaped by the method for manufacturing a three-dimensional shaped object according to one embodiment of the present disclosure, in a state before a binder is supplied.
Figure 6:
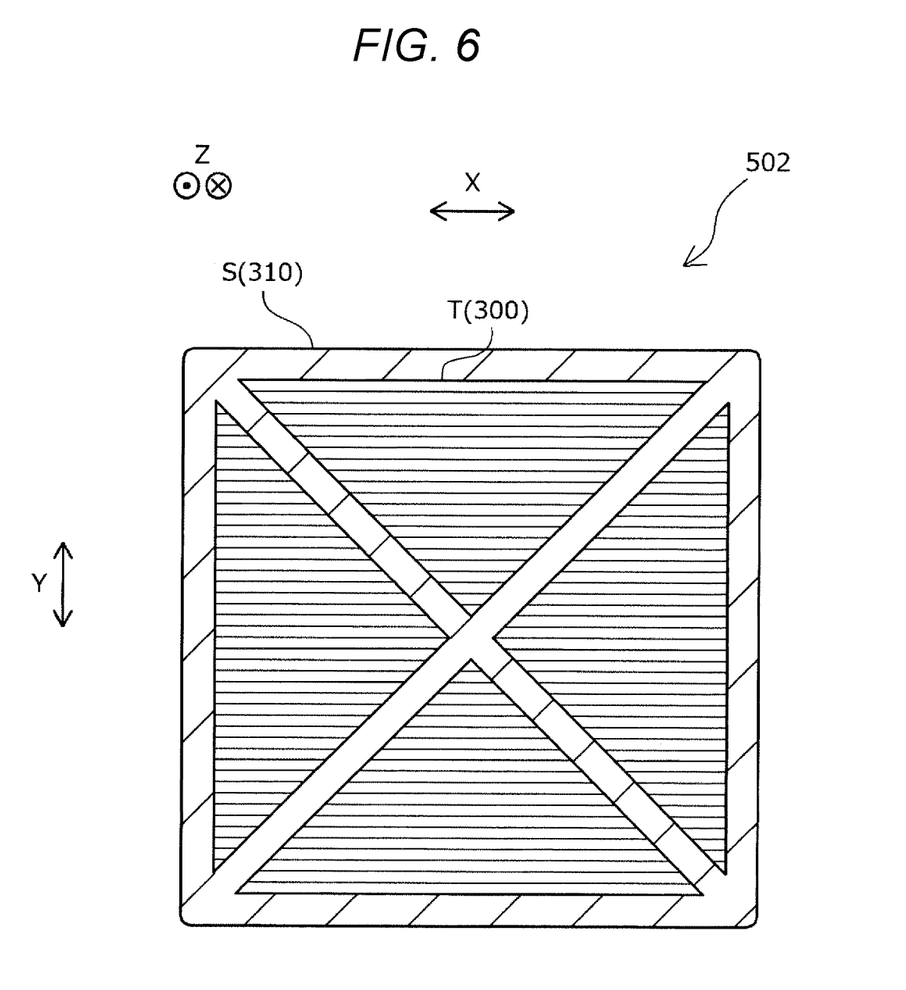
FIG. 6 is a schematic plan view showing the example of the single-layer structure and support when the structure is shaped by the method for manufacturing a three-dimensional shaped object according to one embodiment of the present disclosure, in a state after the binder is supplied.

Then, in the structure shaping step of step S140, as described above, the structure layer 310 is shaped as the structure S with the shaping material including the metal powder or the ceramic powder. Specifically, for example, the shaping material is supplied to the shaping table 9 from the shaping material supply unit 2, the shaping material is compressed and leveled by the compression roller 6 as shown in a second state from a top in FIG. 2, and then the structure S is shaped by supplying the binder from the binder supply unit 3 to the region corresponding to the structure S as shown in a lowermost state of FIG. 2. Here, FIG. 4 shows a schematic plan view of an example of a state in which the shaping material is supplied from the shaping material supply unit 2 to the shaping table 9 and then the shaping material is compressed and leveled by the compression roller 6, and FIG. 5 is a schematic plan view of an example of a state in which the structure S is shaped by supplying the binder from the binder supply unit 3 after the state in FIG. 4. In FIGS. 5 and 6, only the corresponding region of the structure S is shown, and surrounding shaping materials are omitted.

When it is determined that the support layer 300 is to be formed in the support forming determining step of step S120 as in a case of forming the layer 502, shaping of the support layer 300 is performed prior to shaping of the structure layer 310. On the other hand, when it is determined that the support layer 300 is not to be formed in the support forming determining step of step S120 as in a case of forming the layer 501, the support shaping step of step S130 is omitted and the shaping of the structure layer 310 is performed.

Then, in a shaping data end determining step of step S190, the control unit 12 of the device 1 for manufacturing a three-dimensional shaped object determines whether or not the forming of the layer 500 based on the shaping data input in step S110 is all completed. When it is determined that the forming of the layer 500 is not all completed, the process returns to the support forming determining step of step S120 to form a next layer 500. On the other hand, when it is determined that the forming of the layer 500 is all completed, the process proceeds to a degreasing step of step S200.

Figure 7:
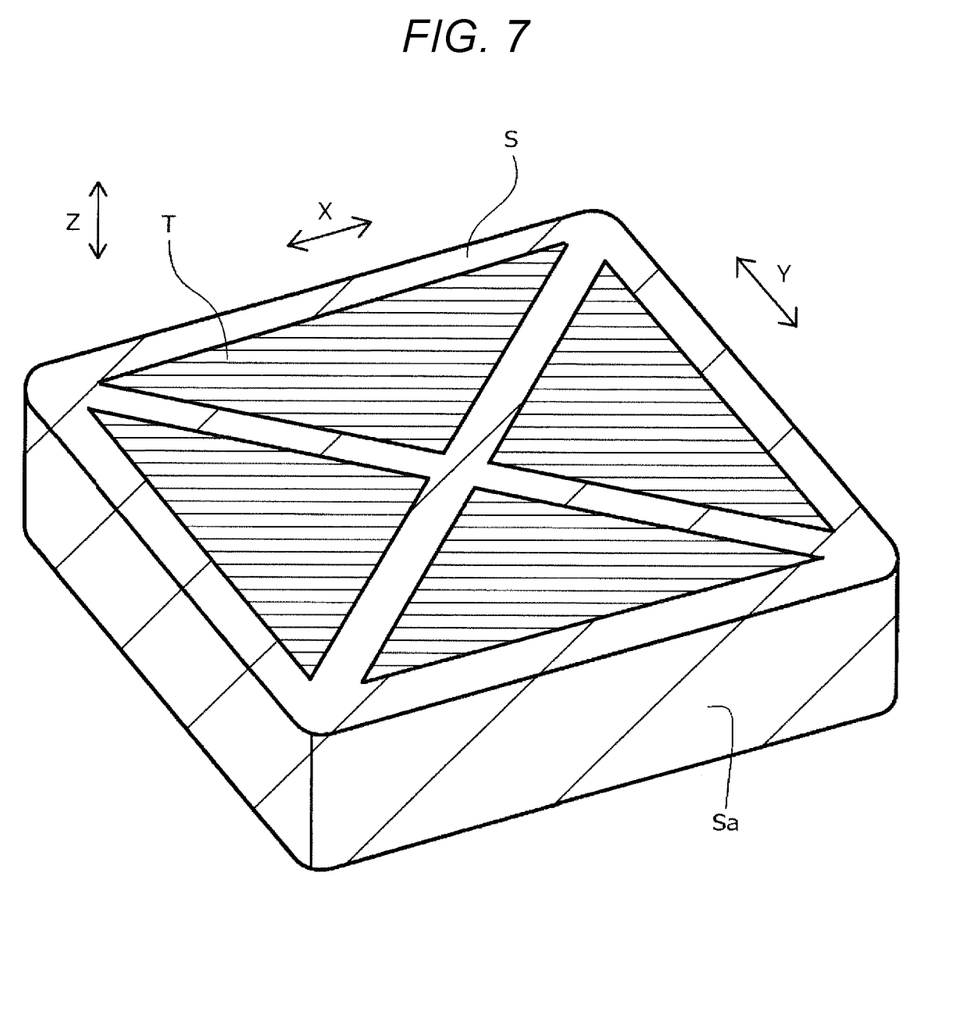
FIG. 7 is a schematic perspective view showing an example of a housing of the structure and the support formed by laminating a plurality of layers when the structure is shaped by the method for manufacturing a three-dimensional shaped object according to one embodiment of the present disclosure.
Figure 8:
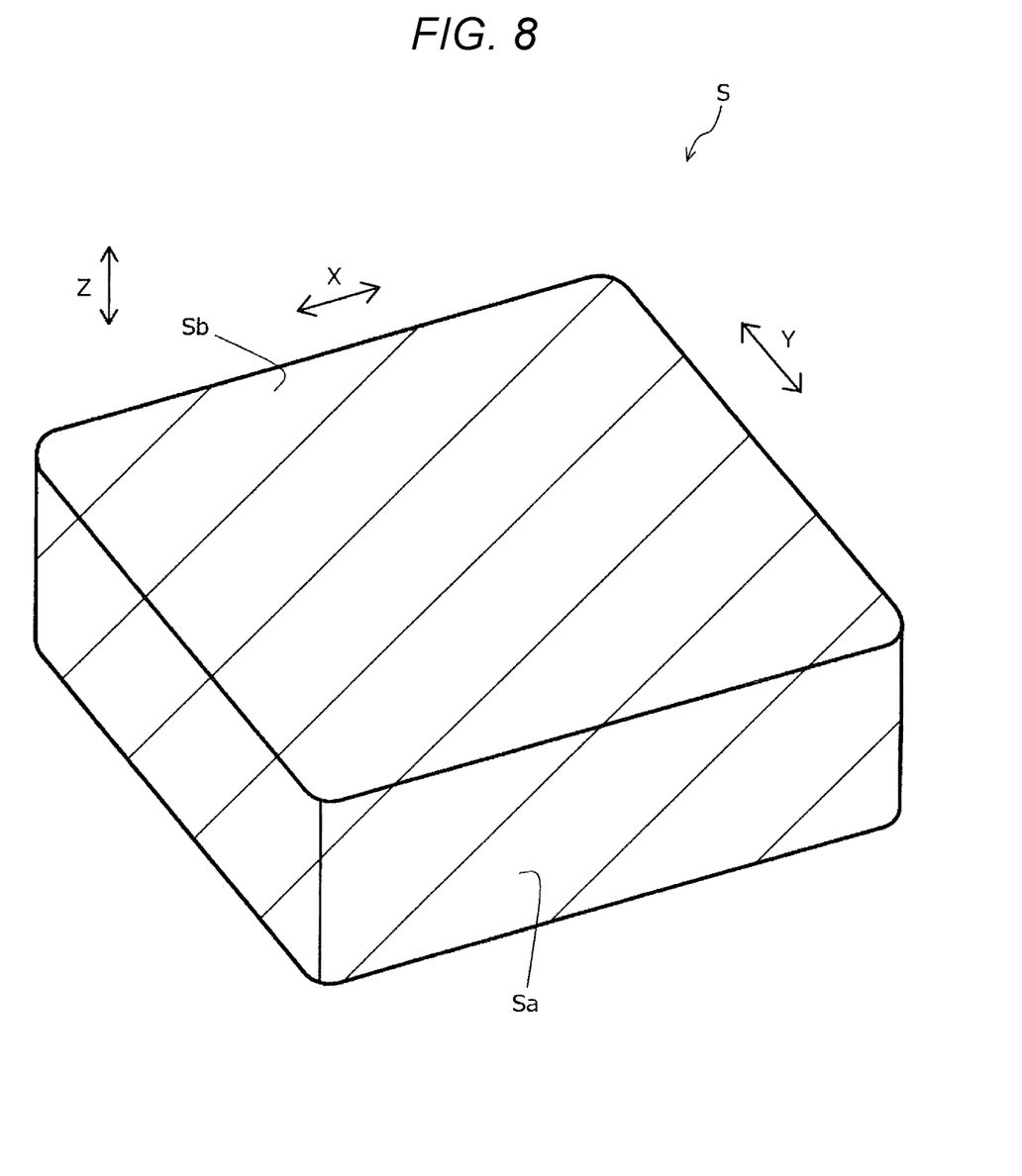
FIG. 8 is a schematic perspective view showing a state in which a lid is further formed on the structure in a state in which the support shown in FIG. 7 is housed in the housing.

Here, FIGS. 4 to 8 show state diagrams of an example when a rectangular parallelepiped structure S having a space therein is shaped. In details, FIGS. 4 to 6 show a state when the layer 502 of the structure S is formed, FIG. 7 shows a state in which a housing Sa of the structure S is formed by repeating laminating of the layer 500, and FIG. 8 shows a state in which a green body of the structure S is completed by forming a lid Sb on the housing Sa. That is, in the method for manufacturing a three-dimensional shaped object according to the embodiment, first, the housing Sa is shaped as the structure S, and the support T is integrally shaped simultaneously with the housing Sa such that the support T is housed in the housing Sa. Then, after the support T is housed in the housing Sa, the lid Sb is shaped. Since the shaping of the lid Sb is performed in a state of being supported not only by the housing Sa but also by the support T, deformation of the lid Sb is prevented. In the degreasing step of step S200, the green body of the structure S shown in FIG. 8 is degreased.

In the degreasing step of step S200, resin components of the structure S and support T manufactured by repeating steps from the support forming determining step of step S120 to the shaping data end determining step of step S190, such as the binder, are degreased by volatilizing the binder contained in the structure S and the resin of the support material contained in the support T in the state of supporting the structure S, using the heater 5 of the device 1 for manufacturing a three-dimensional shaped object or an external device or the like.

Then, in a sintering step of step S210, the structure S degreased in the degreasing step of step S200 is heated to sinter the shaping material. Even when the resin components such as the binder of the structure S or the ultraviolet curable resin of the support T remain after the degreasing step of step S200 is performed, the resin components are removed along with the performing of the sintering step of step S210. Herein, the sintering step of the step S210 may be performed using a device different from the device 1 for manufacturing a three-dimensional shaped object, or may be performed in the device 1 for manufacturing a three-dimensional shaped object by providing the device 1 for manufacturing a three-dimensional shaped object with a thermostatic oven that can be set to a high temperature. Then, with completion of the sintering step of step S210, the method for manufacturing a three-dimensional shaped object of the embodiment ends.

As described above, the method for manufacturing a three-dimensional shaped object according to the embodiment shown in FIG. 3 includes the structure shaping step (step S140) of supplying the shaping material including the metal powder or the ceramic powder, and supplying the binder to the region corresponding to the structures of the three-dimensional shaped object to be shaped in the shaping material; the support shaping step (step S130) of shaping, with the support material including the resin, the support T supporting the structure S; and the degreasing step of degreasing the support T and the binder, the support T being in the state supporting the structure S.

By performing the method for manufacturing a three-dimensional shaped object according to the embodiment, the structure S can be shaped with the binder and the shaping material including the metal powder or the ceramic powder, the support T can be shaped with the support material including the resin, and not only the binder but also the support T in the state of supporting the structure S can be degreased. Therefore, by degreasing the support T, the possibility that the support T cannot be removed can be reduced even when the shape of the structure S is complicated.

In addition, in the method for manufacturing a three-dimensional shaped object according to the embodiment shown in FIG. 3, when the structure shaping step of step S140 and the support shaping step of step S130 are performed to form one or more layers 500, the structure S is shaped after the support T is shaped in each layer 500. In other words, the structure shaping step of step S140 is performed after the support shaping step of step S130 is performed for every layer 500. Then, in the structure shaping step of step S140, as shown in FIG. 2, the shaping material is supplied to the position other than a shaping position P of the support T. Therefore, in each layer 500, the structure S can be easily formed at a desired forming position of the structure S, and the support T can be formed at a desired forming position of the support T.

In addition, as described above, in the method for manufacturing a three-dimensional shaped object according to the embodiment shown in FIG. 3, the resin used in the shaping material is the ultraviolet curable resin, and the support shaping step of step S130 includes the irradiation step of irradiating the support material with the ultraviolet rays. Therefore, by performing the method for manufacturing a three-dimensional shaped object according to the embodiment shown in FIG. 3, the support can be shaped with high precision using the support material including the ultraviolet curable resin, so that a high-precision structure S can be shaped.

However, the resin used in the shaping material may be a thermoplastic resin. The thermoplastic resin is a resin that is melted from a solid to a liquid by heating. When the thermoplastic resin is used as the shaping material, in the support shaping step, it is preferable to shape the support by injecting the support material in a molten state. With such a support shaping step, the support T can be easily shaped using the support material including the thermoplastic resin, so that the structure S can be easily shaped.

In addition, the method for manufacturing a three-dimensional shaped object according to the embodiment shown by a flowchart of FIG. 3 includes the sintering step of step S210 of sintering the shaping material after the degreasing step of step S200. That is, by performing the method for manufacturing a three-dimensional shaped object according to the embodiment including the sintering step shown by the flowchart of FIG. 3, the high-rigidity three-dimensional shaped object in which the metal powder or the ceramic powder is sintered can be shaped.

In addition, the degreasing step of step S200 in the method for manufacturing a three-dimensional shaped object according to the embodiment shown by the flowchart of FIG. 3 is a step of heating and vaporizing the support T. The degreasing can be easily performed by heating and vaporizing the support T.

However, the method for manufacturing a three-dimensional shaped object according to the present disclosure is not limited to such a degreasing step. For example, as the degreasing step, the step of dissolving the support T with the solvent can also be used. The degreasing can be performed with high precision by dissolving the support T with the solvent.

Next, specific examples of the shaping material that can be used in the method for manufacturing a three-dimensional shaped object according to the present disclosure will be described. As the metal powder that can be contained in the shaping material, for example, simple powder of magnesium (Mg), iron (Fe), cobalt (Co) or chromium (Cr), aluminum (Al), titanium (Ti), copper (Cu), nickel (Ni), or powder of alloys containing one or more of these metals (marging steel, stainless steel (SUS), cobalt chromium molybdenum, titanium alloy, nickel alloy, aluminum alloy, cobalt alloy, cobalt chromium alloy), and mixed powder thereof can be used.

In addition, as the ceramic powder that can be contained in the shaping material, for example, silicon dioxide, titanium dioxide, aluminum oxide, zirconium oxide, silicon nitride or the like can be preferably used.

In addition, a specific example of the support material will be described. As the resin that can be used in the support material, for example, PMMA (acryl), ABS (acrylonitrile-butadiene-acrylate), ASA (acrylonitrile-styrene-acrylate), PLA (polylactic acid), PEI (polyetherimide), PC (polycarbonate), PP (polypropylene), PE (polyethylene), PA (polyamide), EP (epoxy), PPS (polyphenylene sulfide), PS (polystyrene), paraffin wax, and other thermoplastic resins can be preferably used. In addition, the ultraviolet curable resin of a type using radical polymerization of an unsaturated double bond such as acryl or a type using cationic polymerization such as epoxy can also be used.

As the resin that can be contained in the binder and that can be contained in the shaping material, for example, polyvinyl alcohol, carboxymethyl cellulose, polypropylene, polyethylene, polystyrene, polyoxymethylene, polymethyl methacrylate, paraffin wax, or the like can be preferably used. Further, for example, polyvinyl alcohol (PVA), acrylic resin, epoxy resin, silicone resin, cellulose resin or other synthetic resin or PLA (polylactic acid), PA (polyamide), PPS (polyphenylene sulfide) or other thermoplastic resins, or the like can be used alone or in combination.

In addition, the shaping material and the support material may further include the solvent, examples of preferred solvents include, for example, water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; and ionic liquids such as tetraalkylammonium acetates (for example, tetrabutylammonium acetate) or the like, and one or more selected from these solvents can be used in combination.

Second Embodiment

Figure 9:
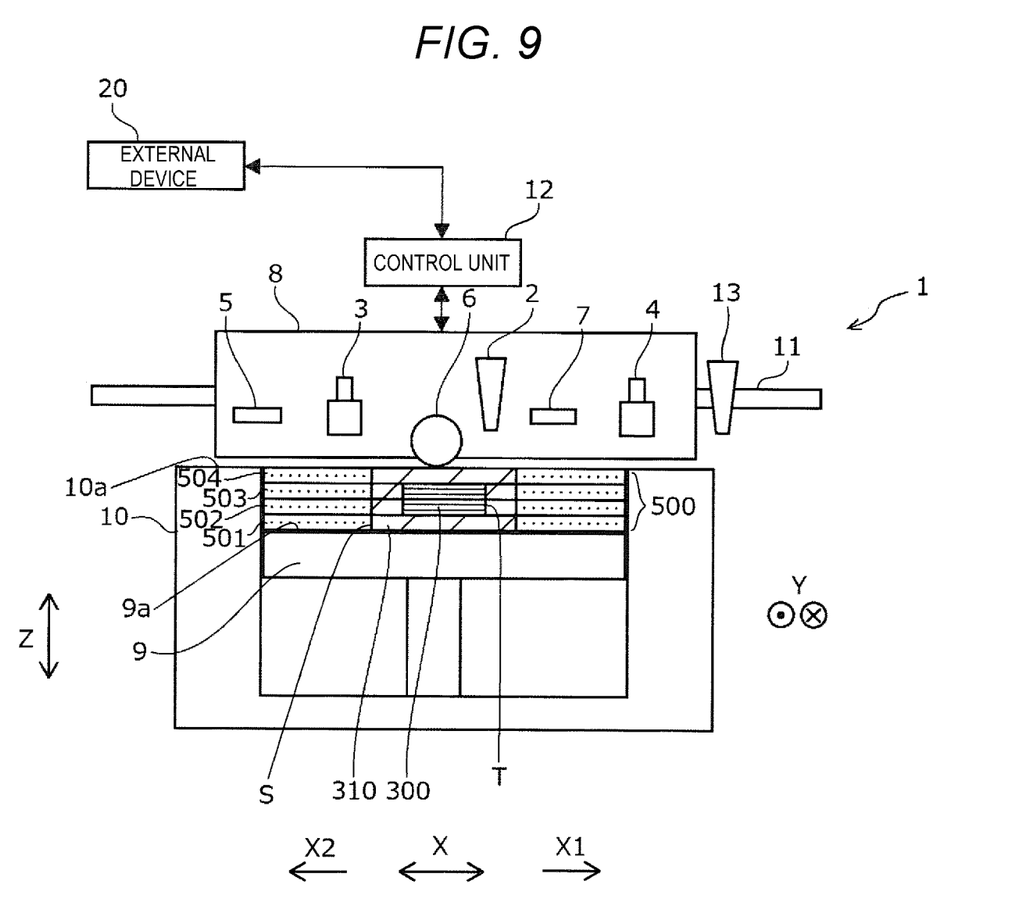
FIG. 9 is a schematic configuration diagram showing a device for manufacturing a three-dimensional shaped object according to a second embodiment, and the device is configured to perform a method for manufacturing a three-dimensional shaped object according to the present disclosure.

Next, an example of a device 1 for manufacturing a three-dimensional shaped object according to a second embodiment will be described with reference to FIG. 9 and the device 1 has a different configuration from the device 1 for manufacturing the three-dimensional shaped object according to the first embodiment that is configured to perform the method for manufacturing a three-dimensional shaped object according to the present disclosure. FIG. 9 is a diagram corresponding to FIG. 1. Here, the device 1 for manufacturing a three-dimensional shaped object of the embodiment has a similar configuration with the device 1 for manufacturing a three-dimensional shaped object of the first embodiment except that a suction unit 13 is provided. Therefore, a description of the common configuration other than the suction unit 13 is omitted. Constituent members common to the first embodiment are denoted by the same reference numerals.

As shown in FIG. 9, the device 1 for manufacturing a three-dimensional shaped object according to the embodiment includes the suction unit 13. Similarly with the supply unit 8, the suction unit 13 is configured to be movable in the X direction along the guide bar 11. The suction unit 13 is configured to suck the shaping material in a region of the layer 500, where the binder is not applied, by moving in the X direction along the guide bar 11. However, a configuration of the suction unit 13 is not particularly limited.

Figure 10:
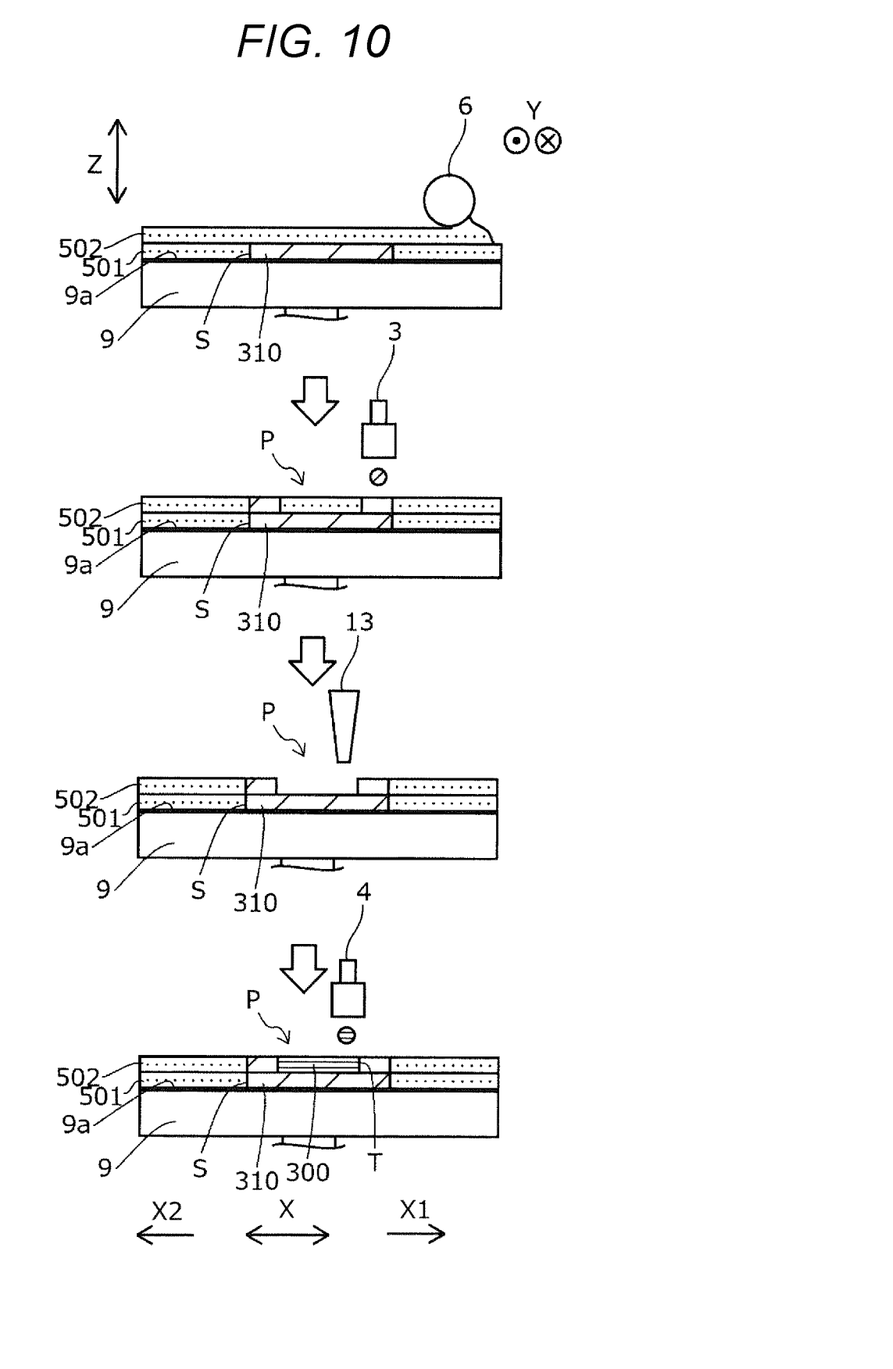
FIG. 10 is a schematic diagram illustrating the method for manufacturing a three-dimensional shaped object according to one embodiment of the present disclosure, and the method is performed using the device for manufacturing a three-dimensional shaped object according to the second embodiment.
Figure 11:
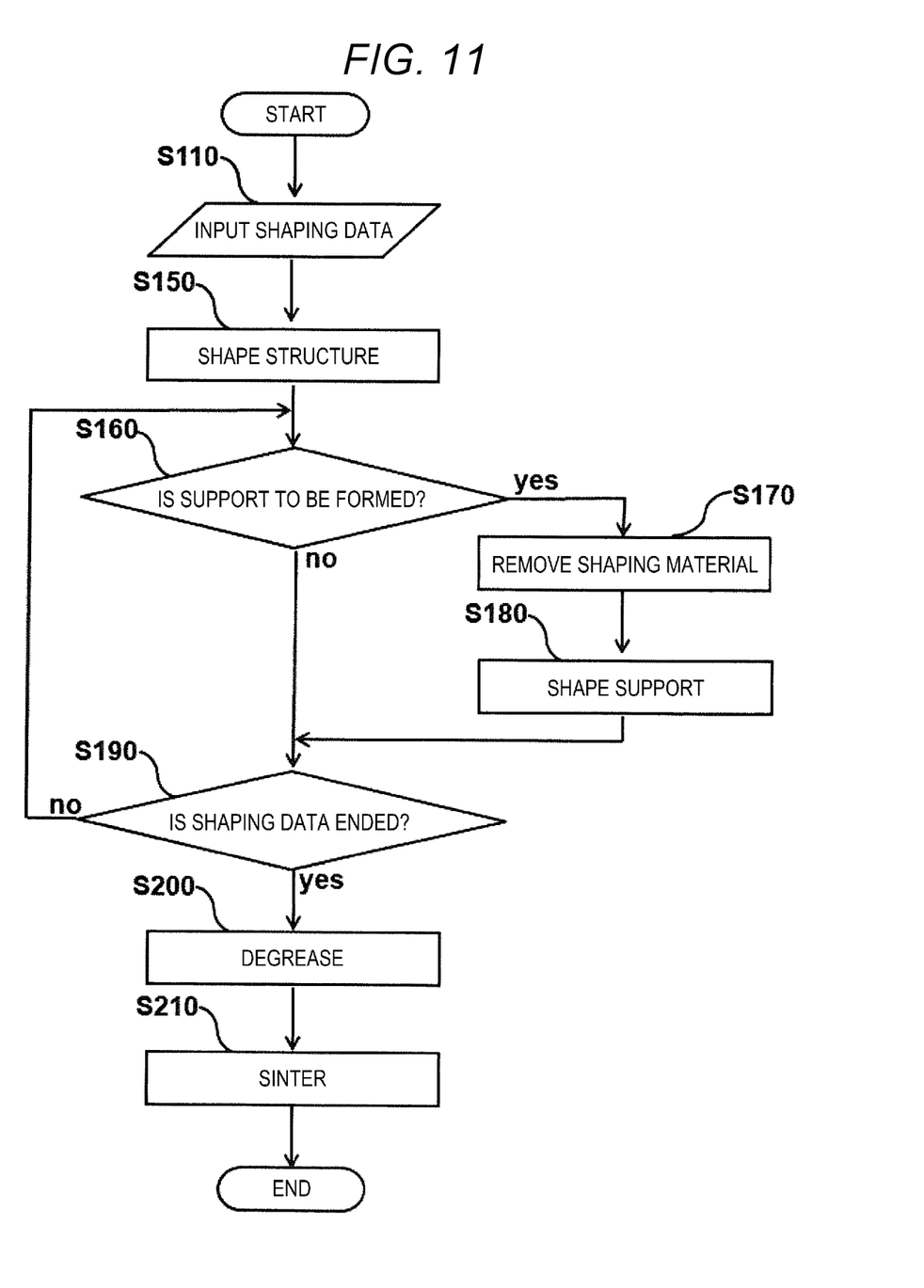
FIG. 11 is a flowchart of the method for manufacturing a three-dimensional shaped object according to one embodiment of the present disclosure, and the method is performed using the device for manufacturing a three-dimensional shaped object according to the second embodiment.

Next, an example of a method for manufacturing a three-dimensional shaped object that can be performed using the device 1 for manufacturing a three-dimensional shaped object according to the embodiment will be described using FIG. while referring to FIG. 10. FIG. 10 is a diagram corresponding to FIG. 2, and FIG. 11 is a diagram corresponding to FIG. 3. Here, since steps with the same step numbers in a flowchart of FIG. 11 and the flowchart of FIG. 3 are the same steps, the description of the steps with the step numbers described in the method for manufacturing a three-dimensional shaped object shown by the flowchart of FIG. 3 will be omitted.

In the method for manufacturing a three-dimensional shaped object according to the embodiment, as shown in FIG. 11, after the shaping data of the three-dimensional shaped object to be manufactured is input in the shaping data input step of step S110, a structure shaping step of step S150 is performed based on the shaping data. In the structure shaping step of step S150, the structure layer 310 is shaped as the structure S with the shaping material including the metal powder or the ceramic powder. Specifically, for example, the shaping material is supplied to the shaping table 9 from the shaping material supply unit 2, the shaping material is compressed and leveled by the compression roller 6 as shown in a top state in FIG. 10, and then the structure S is shaped by supplying the binder from the binder supply unit 3 to a region corresponding to the structure S as shown in a second state from a top in FIG. 10.

Next, in a support forming determining step of step S160, the control unit 12 of the device 1 for manufacturing a three-dimensional shaped object determines, based on the shaping data, whether or not to form the support layer 300. Then, when it is determined that the support layer 300 is to be formed, the process proceeds to a shaping material removing step of step S170, and when it is determined that the support layer 300 is not to be formed, the process proceeds to the shaping data end determining step of step S190.

When it is determined, in the support forming determining step of step S160, that the support layer 300 is to be formed, the shaping material in the region where the support T is to be formed is sucked and removed by the suction unit 13 in the removing step of step S170. Specifically, for example, as shown in a third state from the top in FIG. 10, when the suction unit 13 is located at a position facing the shaping position P of the support T, the suction unit 13 is driven to suck the shaping material at the shaping position P of the support T. Since the binder is supplied to a region corresponding to the structure S around the shaping position P of the support T, the shaping material at the shaping position P of the support T can be suctioned cleanly.

Then, after the removing step of step S170 is completed, the process proceeds to a support shaping step of step S180, and in the support shaping step of step S180, for example, the support layer 300 as the support T is shaped at the shaping position P of the support T as shown in a lowermost state of FIG. 10. In the embodiment, the support material, which is the ultraviolet curable ink, is supplied from the support supply unit 4, and then the irradiation step of irradiating the support material with ultraviolet rays from the ultraviolet irradiating unit 7 is performed to shape the support T. However, when one that can supply the support material including a thermosetting resin is used as the support supply unit 4, the irradiation with the ultraviolet rays from the ultraviolet irradiating unit 7 can be omitted.

When the support shaping step of step S180 is completed, the process proceeds to the shaping data end determining step of step S190. Steps after the shaping data end determining step of step S190 are similar with those of the method for manufacturing a three-dimensional shaped object shown in the flowchart of FIG. 3.

That is, in the method for manufacturing a three-dimensional shaped object according to the embodiment shown in FIG. 11, when the structure shaping step of step S150 and the support shaping step of step S180 are performed to form one or more layers 500, the support shaping step of step S180 is performed after the structure shaping step of step S150 is performed for every layer 500, and the removing step of step S170 of removing, from the shaping position P of the support T, the shaping material supplied along with the performing of the structure shaping step of step S150 is performed. In the support shaping step of step S180, the support material is supplied to the shaping position P of the support T, from which the shaping material is removed in the removing step of step S170, to shape the support T. Therefore, by performing the method for manufacturing a three-dimensional shaped object according to the embodiment shown in FIG. 11, in each layer 500, the structure S is shaped prior to the shaping of the support T, and the support T can be shaped after the shaping material at the shaping position P of the support T is removed. By shaping the structure S first, the shaping material can be evenly supplied in each layer 500, and a high-rigidity structure S can be shaped.

The present disclosure is not limited to the embodiments described above, and may be implemented by various configurations without departing from the scope of the present disclosure. For example, in order to solve a part or all of the problems described above, or to achieve a part or all of the effects described above, technical characteristics in the embodiments corresponding to the technical characteristics in each aspect described in the summary of the disclosure can be replaced or combined as appropriate. In addition, when the technical characteristics are not described as essential in the present description, the technical characteristics can be deleted as appropriate.

What is claimed is:

1. A method for manufacturing a three-dimensional shaped object, comprising:
a structure shaping step of supplying a shaping material including metal powder or ceramic powder, and supplying a binder to a region corresponding to a structure of the three-dimensional shaped object to be shaped in the shaping material;
a support shaping step of shaping, with a support material consisting of a resin, a support supporting the structure; and
a degreasing step of simultaneously degreasing the support and the binder by heating and vaporizing the binder of the structure and the resin of support while the support is in a state of supporting the structure,
wherein the support is entirely removed during the degreasing step.

2. The method for manufacturing a three-dimensional shaped object according to claim 1, wherein
when the structure shaping step and the support shaping step are performed to form one or more layers, the structure shaping step is performed after the support shaping step is performed for every layer, and the shaping material is supplied to a position other than a shaping position of the support in the structure shaping step.

3. The method for manufacturing a three-dimensional shaped object according to claim 1, wherein
when the structure shaping step and the support shaping step are performed to form one or more layers, the support shaping step is performed after the structure shaping step is performed for every layer, a removing step of removing, from a shaping position of the support, the shaping material supplied along with performing of the structure shaping step is performed, and in the support shaping step, the support material is supplied to the shaping position of the support, from which the shaping material is removed in the removing step, to shape the support.

4. The method for manufacturing a three-dimensional shaped object according to claim 1, wherein
the resin is an ultraviolet curable resin, and
the support shaping step includes an irradiation step of irradiating the support material with ultraviolet rays.

5. The method for manufacturing a three-dimensional shaped object according to claim 1, wherein
the resin is a thermoplastic resin, and
in the support shaping step, the support is shaped by injecting the support material in a molten state.

6. The method for manufacturing a three-dimensional shaped object according to claim 1, further comprising:
a sintering step of sintering the shaping material after the degreasing step.

* * * * *